Nov. 22, 1932.                B. H. SMITH                 1,888,243
                             TURPENTINE TOOL
                           Filed Dec. 15, 1930
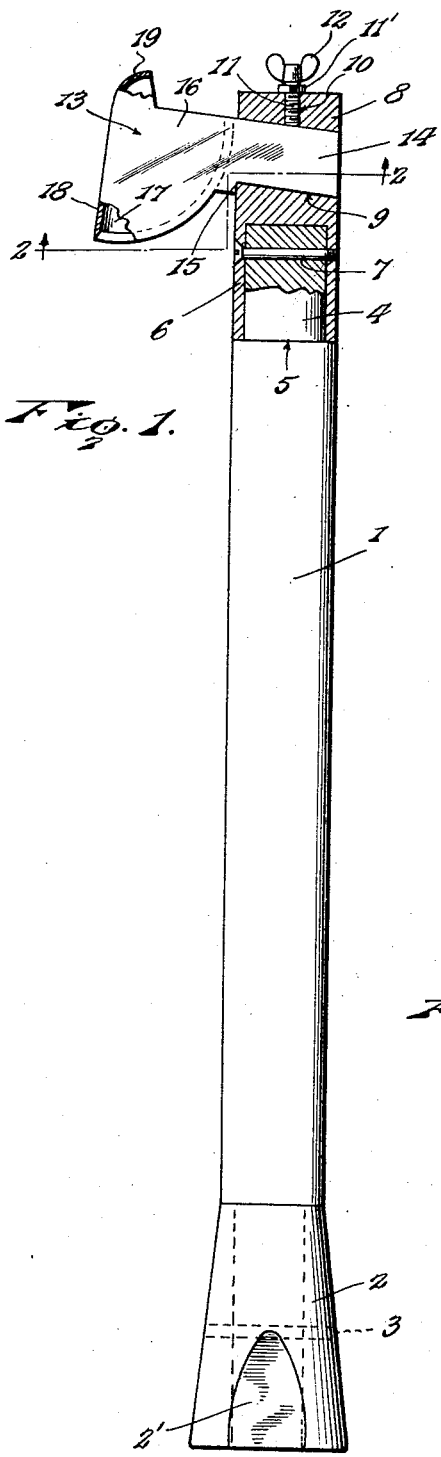
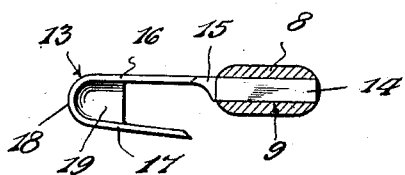
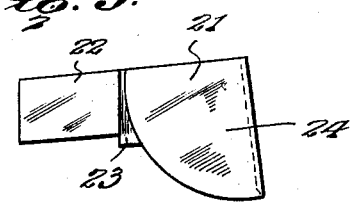
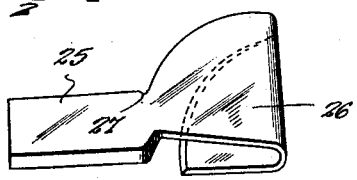
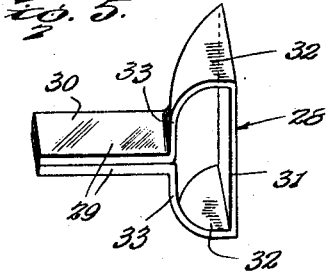
Inventor
Bennie H. Smith.
By Lacey & Lacey,
Attorneys Patented Nov. 22, 1932

1,888,243

UNITED STATES PATENT OFFICE

BENNIE H. SMITH, OF MANATEE, FLORIDA, ASSIGNOR OF ONE-HALF TO A. B. MURPHY, OF MANATEE, FLORIDA

TURPENTINE TOOL

Application filed December 15, 1930. Serial No. 502,503.

This invention relates to a turpentine tool and more particularly to a tool by means of which a tree is cut in order to form a bleeding face preparatory to applying a cup to the tree or in order to renew the bleeding face.

One object of the invention is to provide a turpentine tool having an improved type of cutting implement and also improved means for firmly securing the implement to a handle.

Another object of the invention is to so mount the implement upon the handle that it will be very firmly secured and will not be liable to be worked loose by strain exerted when cutting a tree.

Another object of the invention is to provide an improved type of cutting blade of such construction that wood cut from a tree may easily pass through the blade and further to so form the blade that the strips of wood cut from the tree will be deflected and guided away from the tree during a cutting operation.

Another object of the invention is to so form the shank of the cutting implement that it may have firm engagement with the handle and be braced during a cutting operation.

The invention is illustrated in the accompanying drawing, wherein

Figure 1 is a view showing the improved turpentine tool partially in side elevation and partially in section.

Fig. 2 is a transverse sectional view taken on the line 2—2 of Fig. 1,

Fig. 3 is a side elevation of a slightly modified form of cutting element looking from the opposite side of Fig. 1, Fig. 4 is a perspective view of another modified form of cutting element, and Fig. 5 is a perspective view of a further modified form of cutting element.

The handle 1 of this turpentine tool is preferably formed of wood although other materials found suitable may be used and may be of any length desired. The rear end of the handle is reduced, as indicated by dotted lines in Figure 1, and about this reduced end of the handle is disposed a weight 2 which is firmly secured by a pin 3 and serves as a counter-balance and also to prevent the handle from slipping forwardly out of a person's hand when the tool is in use. One or more flat side faces 2' may be formed upon the weight. The forward end of the handle is reduced to form a neck 4 having a shoulder 5 at its inner end and about this neck is fitted a cap 6 which is firmly secured by a screw 7 passed transversely through the cap and neck. The cap is formed with a solid head 8 which projects forwardly from the handle and this head is formed with a transversely extending passage 9 which is rectangular in cross section and extends diagonally, as clearly shown in Fig. 1. Intermediate the ends of the passage the head is formed with a threaded opening 10 leading from the outer end of the head and communicating with the passage. Through this opening is engaged a set screw 11 having wings 12 at its outer end so that the set screw may be easily turned and tightened in order to firmly but releasably secure a cutting implement to the handle. A nut 11' locks the screw in a set position.

In Figures 1 and 2, there has been shown a cutting implement having a head 13 and shank 14. The shank 14 is of a solid construction and is rectangular in cross section so that it will fit snugly within the passage 9. It should also be noted that this shank is disposed at an incline relative to the head so that it may extend through the passage, as shown in Figure 1, and is of such length that its rear end terminates flush with one end of the passage and adjacent the head is formed with a shoulder 15 to bear against the head 8 below the passage. By this arrangement rearward movement of the shank through the passage will be limited and since the shank extends diagonally of the handle strain exerted when the tool is in use will not be liable to bend or break the cutting implement. The head of the cutting implement is U-shaped in cross section or when viewed from one end as shown in Figure 2, thereby forming side walls 16 and 17 which are united by a bridge portion 18. The bridge is arcuate transversely, as shown clearly in Figure 2, and the two walls are disposed in such angular relation to each other that, while the wall 16 which is formed integral with the shank 14 extends flush with one side face of the shank, the other wall 17 extends at an incline and projects beyond the plane of the other side face of the shank. Therefore, ample room is provided between the walls of the head and there will be no danger of wood becoming wedged between the walls. It should also be noted that the rear portion of the bridge and adjacent portions of the walls 16 and 17 have been extended rearwardly and curved longitudinally of the bridge to form a deflector 19 which serves very effectively to guide a strip of wood cut from a tree by the cutting element and prevent this strip of wood from becoming wedged between the side walls of the cutter.

In Figure 3, there has been shown a cutting implement, indicated in general by the numeral 21. This cutting implement is quite similar to that shown in Figures 1 and 2 and has a shank 22 corresponding to the shank 14 and formed with a shoulder 23 similar to the shoulder 15. The head 24 of this cutter is of the same construction shown in Figures 1 and 2, except that the deflector 19 has been omitted. In either construction the strip of wood cut from a tree by the cutting implement may pass through the head between the side walls and as the side walls extend in diverging relation to each other the strip of wood will not be liable to become wedged between the walls.

In Figure 4, there has been shown a cutting implement which may be substituted in place of that shown in Figure 1 and includes a shank 25 of such dimensions that it may be snugly received in the passage 9. The cutting head 26 is similar in shape to the cutting head 21, except that its wall which is formed integral with the shank is of less width than the shank at its junction therewith. Therefore, the cutter shown in this figure is not provided with a shoulder to bear against the head 8 of the cap 6 but is formed with a recess or notch 27 into which a portion of the head at one end of the passage 9 may engage when the shank is fitted into the passage and secured therein by tightening the set screw 11.

The cutter 28 illustrated in Figure 5 may also be used in place of the cutter shown in Figure 1. This cutter is formed from a metal blank having its intermediate portion bent to form a cutting head and its end portions 29 disposed in flat contacting engagement with each other to form a shank 30 adapted to fit snugly in the passage 9. The end portions of the blank forming the shank may be firmly secured in contacting engagement with each other in any desired manner. The head is substantially rectangular in shape and has an outer wall 31, end walls 32 and inner wall portions 33 which extend from the end walls to the shank. The forward edges of the end walls and outer wall are sharpened and since the head is open at its front and rear wood cut from a tree by means of this cutting implement may easily pass through the cutter.

Having thus described the invention, I claim:

1. A tool of the character described comprising a staff, a metal cap for the staff having a thick head projecting forwardly therefrom and formed with a transversely extending passage disposed at an incline, a set screw engaged through a threaded passage formed longitudinally of the head and leading from the outer end thereof to said passage, and a cutting element having a head and a shank projecting therefrom at an incline and engaged through said passage and fitting snugly therein, a shoulder being formed upon said shank adjacent the head of the cutting element to bear against the head of the cap at the front end of the passage and limit rearward movement of the shank when thrust through the passage, said set screw when tightened having its inner end engaging said shank to releasably secure the shank in the passage.

2. A cutting element for a tool of the character described comprising a shank, and a head carried by said shank, the head being U-shaped in cross section to form side walls joined by a bridge portion, the walls and bridge having sharpened front edges, and a chip deflector at the rear end of said bridge.

3. A cutting element for a tool of the character described comprising a shank reduced in width from its rear end to a point in spaced relation to its front end to form a shoulder adjacent its front end to limit movement of the shank when thrust through a handle, and a head U-shaped in cross section to form side walls joined by a bridge portion, one side wall being formed integral with the shank and the other side wall free from the shank, the forward edges of the side walls and bridge being sharpened.

4. A cutting element for a tool of the character described comprising a shank reduced from its rear end to a point in spaced relation to its front end to form a shoulder adjacent its front end, and a head U-shaped in cross section to form side walls joined by a bridge portion, one end of the bridge and adjoining portions of the side walls being extended to form a chip deflector curved longitudinally.

5. A cutting element for a tool of the character described comprising a shank, and a head U-shaped in cross section to form side walls joined by a bridge portion, one wall being rigid with the shank, and the bridge and adjoining portions of the walls being extended at the rear end of the bridge to form a chip deflector.

6. A cutting element for a tool of the character described comprising a shank, and a head U-shaped in cross section to form side walls joined by a bridge portion, one wall being rigid with the shank and the other wall free from the shank, and a chip deflector at one end of the bridge.

In testimony whereof I affix my signature.

BENNIE H. SMITH. [L. S.]